July 5, 1938.  T. EARLE  2,122,607
COTTON SEPARATING AND RECOVERING METHOD
Filed March 23, 1936
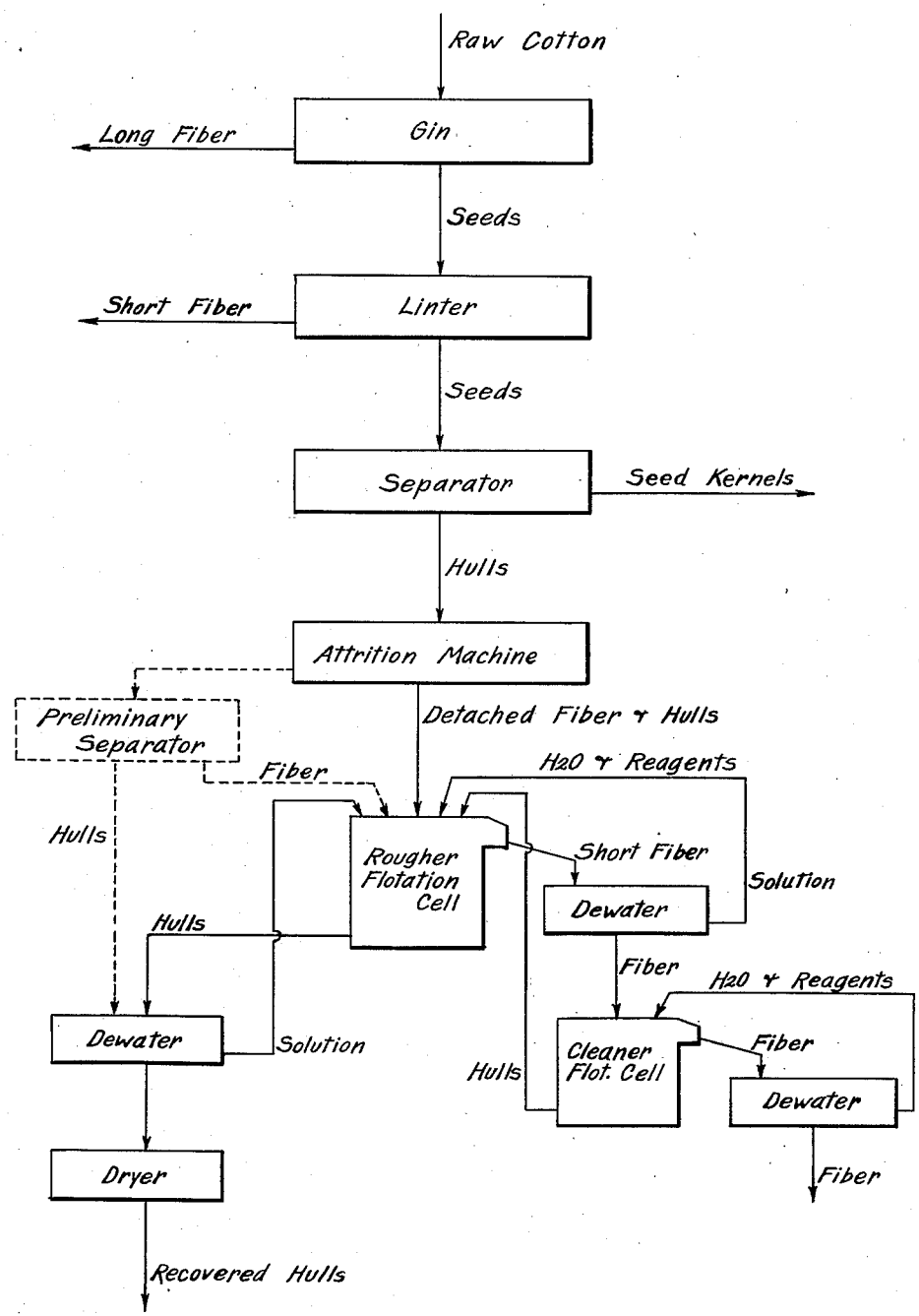
Inventor
Theodore Earle,
By Homer S. Sweet.
Attorney Patented July 5, 1938

2,122,607

UNITED STATES PATENT OFFICE 2,122,607

COTTON SEPARATING AND RECOVERING METHOD

Theodore Earle, Los Angeles, Calif.

Application March 23, 1936, Serial No. 70,217

2 Claims. (Cl. 209—2)

This invention relates to the treatment of raw, natural cotton, and more particularly to the separation and recovery of the constituent elements of natural cotton, and has as an object to provide an improved method whereby a more perfect separation between and an enhanced practical recovery of the constituent elements of such cotton may be had.

A further object of the invention is to provide an improved method operable for enhanced recovery of raw cotton fiber.

A further object of the invention is to provide an improved method operable in supplemental relation with conventional processes for separation and enhanced recovery of fiber relative to the seed and hull constituents of natural cotton.

A further object of the invention is to provide an improved method for the enhanced separation and recovery of fiber from natural cotton which is simple and inexpensive of practice, readily susceptible of incorporation with and as a supplement to conventional practices, and which is practical and highly efficient to the ends sought.

My invention consists in the nature, relation, sequence and combination of individual steps hereinafter set forth, pointed out in my claims, and diagrammatically illustrated in the accompanying drawing, in which—

The figure is a diagrammatic flow sheet representing a preferred arrangement of conventionally indicated apparatus wherethrough the improved method may be practically developed.

Natural cotton as gathered from the fields is a combination of fiber and seeds, which latter comprise kernels enclosed in hulls or shells to which the fibers are attached. The fiber, kernels, and hulls all have commercial value, and the treatment to which the natural cotton is first subjected is directed toward a complete separation and separate recovery of the three elements of the natural product. Conventional practice first subjects the cotton bolls to the action of a gin or equivalent machine wherein the longer fibers are stripped from the hulls and recovered separately from the latter, the stripped seeds, which still carry a considerable amount of fiber, preferably passing through a second machine of gin type, or "linter", where they are further cleaned for additional separation and recovery of fiber of less strand length than that resulting from the first ginning operation. The seeds discharged from the second stripping operation are then treated in a suitable separatory apparatus where the hulls are cut or broken to release the seed kernels and which acts to effect a separation between and a separate recovery of the seed kernels and hulls, the hull product from this latter operation carrying attached short fiber amounting to from twenty to forty percent of the total weight of the hull product.

The hull product from conventional methods has commercial value as stock food, fertilizer, and for other purposes, but when the fiber is separated from the hull product the remaining hulls are enhanced in commercial value and the recovered fiber, free from hulls, has itself a value in excess of the maximum value of the hulls. Various methods have been attempted in an effort to effect a clean separation and recovery of fiber relative to the hulls of the hull product, and suitable apparatus of attrition type has been developed which will efficiently detach the fiber from the hulls of such product, but though various screening, air separation, and similar practices have been utilized in an effort to separate the detached fibers and hulls of the hull product, such difficulty in obtaining a clean, practical separation has been encountered as to negative the practical advantage of the experiments. None of the methods heretofore commercially employed has been successful in obtaining a fiber recovery adequately free from hull particles or a hull recovery adequately free from fiber, and it is to overcome the disadvantages of previous practices and to provide the desired clean separation that the improved method hereinafter described has been developed.

The improved method comprises a treatment of the hull product resulting from the separatory step wherein the seed kernels are removed from the hulls, and is made effective by first subjecting the hull product to treatment through suitable attrition apparatus for thorough detachment of fiber from the hull elements. The action of the attrition apparatus may be adjusted in time and through successive stages, if desired, to that degree of fiber detachment determined by practical considerations based on costs of treatment and relative values of the fiber and hull elements sought to be recovered. After completion of the fiber detachment, the admixture of fiber and hulls may be subjected to a preliminary separation effected through washing, screening, or air separating apparatus, for the removal of a portion of the hull particles produced during the attrition treatment, or the product from the attrition apparatus may pass directly to the final separatory stage of the improved method, as may be deemed most expedient under given conditions. Final separation of the detached fiber and hulls is had through agitation of the product from the attrition treatment in a froth flotation cell in the presence of suitable reagents, the fiber being entrained by the froth bubbles and carried to the surface of the cell contents as a froth concentrate which can flow off from the cell or be otherwise recovered through technique common to froth flotation processes, the hulls constituting the tailings from the flotation operation and being readily recoverable as such.

Various reagents and combinations of reagents may be employed to effect the desired froth flotation separation of the fiber from the hulls, the usual frothers, of which pine oil, terpineol, cresylic acid, alcohol, and the like, are used as examples, either alone, in combination with one another, or in combination with the usual flotation reagents such as the fatty acids, soaps, and derivatives of the fatty acids, being available and operable to the ends desired. Satisfactory separations of fiber from hulls have been made with a combination of pine oil and alcohol, with a combination of terpineol, alcohol and oleic acid, the specific nature of the material under treatment apparently determining the most desirable combination of reagents to be employed in a given instance, which determination perhaps derives from the relative amount of seed kernel material and consequent cotton seed oil carried by the hull product. Where the alcohols have been employed as reagents it has been found that the amyl, butyl, and hexyl alcohols produce the good results, though other specific alcohols may be adequate and in fact desirable in the treatment of certain hull products. Because of the relatively low specific gravities of the fiber and hull material, a higher pulp dilution may be used than that usually employed in the case of ores, and the like, since too thick a mixture in the cell permits the fiber to entrain hull particles and carry such particles to the froth concentrate, the proper dilution for the material under treatment being readily determinable by test. The froth bubbles should be relatively brittle in order to properly release the hull particles and leave the latter in the cell while only the fiber is carried to the surface, and the froth acts well when it is fairly deep and not too strong.

When the hull product is subjected to a preliminary separation prior to the flotation treatment, the partially separated product, from which some of the clean hulls have been removed, is then passed through the flotation cell in the same manner as when the product is introduced into the cell directly from the attrition apparatus, the preliminary separation being perhaps of limited importance, since a thoroughly satisfactory separation can be had through the flotation step alone, and probably of practical value only when the hull product shows a large excess of hull over fiber.

In the treatment of certain hull products, a conditioning of the product prior to flotation may be of advantage, such conditioning corresponding generally to similar technique applied in the separation of ores and being had either with or without the presence of reagents, as may be most expedient for the separation of a given product.

As examples of practical separations accomplished through exercise of the improved method, the following detailed results are submitted:

In each of the examples given, the cotton seed hull material from conventional processes was first put twice through a McCool pulverizer set to grind ore to pass through a 30 mesh screen. This treatment resulted in a maximum practical detachment of the fiber from the hulls, though some fiber still adhered to the hull material after the treatment. The flotation machine used was a Denver Sub-A unit of 1000 gram size having a capacity of about 4500 c. c. of water, but was employed with an initial charge of 3500 c. c. of water and operated with a froth depth maintained at about three inches. A series of tests was run through the machine and the solution from each test returned to the machine for the next run. After three such tests, it was found that the reagent content of the solution had become a constant insofar as the addition of reagent for subsequent test was concerned, hence the amounts of reagents given in the examples are the quantities to be added to a solution of constant reagent content.

*Example 1.*—100 grams of cotton seed hulls were treated in the pulverizer, conditioned for five minutes with one drop of terpineol (0.8 lb. per ton of hull) and agitated for seven minutes in the flotation machine with one drop of Du Pont Frother B—23 (a high boiling-point alcohol) (0.6 lb. per ton of hull).

|  | Grams |
|---|---|
| Fiber concentrate recovered | 22 |
| Hull tailings recovered | 77 |

*Example 2.*—100 grams of cotton seed hulls were treated in the pulverizer, conditioned for five minutes with one drop of pine oil (0.8 lb. per ton of hull) and agitated for six minutes in the flotation machine with one drop of Du Pont Frother B—23 (a high boiling-point alcohol) (0.6 lb. per ton of hull).

|  | Grams |
|---|---|
| Fiber concentrate recovered | 20 |
| Hull tailings recovered | 78 |

*Example 3.*—100 grams of cotton seed hulls were treated in the pulverizer, conditioned for five minutes with one drop of terpineol (0.8 lb. per ton of hull), one drop of oleic acid (0.8 lb. per ton of hull) and one drop of hexyl alcohol (0.6 lb. per ton of hull) and agitated in the flotation machine for eight minutes.

|  | Grams |
|---|---|
| Fiber concentrate recovered | 18 |
| Hull tailings recovered | 79 |

In each example, the fiber that had been detached from the hulls was floated and only that fiber adhering to the hulls remained in the tailings.

The products from the froth flotation cell may be dewatered and the recovered solution returned for reuse with a consequent saving in the amount of reagent required, such being common practice in flotation operations, and the separated concentrates and tailings from the flotation cell may be subjected to such further washing, cleaning, and recleaning operations as may be deemed expedient or desirable, the ultimate fiber and hull products being dried and packaged as may be indicated for storage or further handling through the commercial channels available to the marketing of such products.

Since the improved method is susceptible of various specific combinations with the conventional steps employed in the treatment of natural cotton, and since such method is susceptible of practice through a wide variety and combination of specific apparatus and specific reagents, all without departing from the spirit of the invention, I wish to be understood as being limited solely by the scope of the appended claims, rather than by any details of the illustrative showing and foregoing description.

I claim as my invention—

1. The method of separating cotton fiber and hulls from cotton-seed hulls which comprises stripping the fiber from the hull material by mechanical means, agitation of the mass in a froth flotation cell in the presence of frothing reagents and recovery of the fiber as a froth concentrate and the hulls as a tailing product.

2. The method of separating cotton fiber and hulls from cotton-seed hulls which comprises stripping the fiber from the hull material by mechanical means, agitation of the mass in a froth flotation cell in the presence of a frothing reagent and a fatty acid and recovery of the fiber as a froth concentrate and the hulls as a tailing product.

THEODORE EARLE.